(12) United States Patent
Wehrle

(10) Patent No.: US 9,051,126 B2
(45) Date of Patent: Jun. 9, 2015

(54) TOOTHED BELT DRIVE SYSTEM FOR AUGERS

(75) Inventor: Jay R. Wehrle, Fort Wayne, IN (US)

(73) Assignee: Novae Corporation, Markle, IN (US)

( * ) Notice: Subject to any disclaimer, the term of this patent is extended or adjusted under 35 U.S.C. 154(b) by 0 days.

(21) Appl. No.: 13/317,118

(22) Filed: Oct. 11, 2011

(65) Prior Publication Data
US 2012/0085624 A1    Apr. 12, 2012

Related U.S. Application Data

(60) Provisional application No. 61/404,948, filed on Oct. 12, 2010.

(51) Int. Cl.
*B65G 33/34* (2006.01)
*B65G 33/14* (2006.01)

(52) U.S. Cl.
CPC .............. *B65G 33/34* (2013.01); *B65G 33/14* (2013.01)

(58) Field of Classification Search
CPC ................................. B65G 33/34; B65G 33/14
USPC .................... 198/674, 816, 667, 672
See application file for complete search history.

(56) References Cited

U.S. PATENT DOCUMENTS

| 3,983,207 | A | * | 9/1976 | Sinnema ..................... 264/297.7 |
| 4,217,980 | A | * | 8/1980 | Kemp, Jr. ...................... 198/666 |
| 4,367,814 | A | * | 1/1983 | Young ........................... 198/301 |
| 4,699,016 | A | * | 10/1987 | Moll ............................... 74/417 |
| 5,370,464 | A | * | 12/1994 | Blaha ............................ 384/252 |
| 5,797,480 | A | * | 8/1998 | Gaddis et al. ................. 198/672 |
| 5,875,882 | A | * | 3/1999 | Pollock ......................... 198/674 |
| 5,876,171 | A | * | 3/1999 | Martin et al. .................... 413/14 |
| 6,082,088 | A | * | 7/2000 | Ohoka et al. .................... 57/300 |
| 6,142,862 | A | * | 11/2000 | Dalgord et al. ............... 452/137 |
| 7,191,489 | B1 | * | 3/2007 | Heath ............................. 15/320 |
| 7,913,518 | B2 | * | 3/2011 | Winkelhake et al. ........... 65/260 |

OTHER PUBLICATIONS

Hutchinson pamphlet, The American Auger, 4 pages.
Westfield pamphlet, What you really want in an auger, 6 pages.
Cardinal pamphlet, Portable Grain Augers, 4 pages.
Mayrath pamphlet, 8' Propeller Shaft, 8' Bottom Drive, 4 pages.
Mayrath pamphlet, InLine Drive Auger, 4 pages.
Sheyenne Tooling & Mfg., Gold Series Portable Auger information sheet.
Feterl information sheet, 8'-Red Auger-10', 2 pages.
Westfield TF Series Augers brochure, 7 pages.
Art's-Way Manufacturing Co., Inc., Driveline Augers, 2 sheets.

* cited by examiner

*Primary Examiner* — Gene Crawford
*Assistant Examiner* — Thomas Randazzo
(74) *Attorney, Agent, or Firm* — George Pappas

(57) ABSTRACT

An auger assembly for transporting bulk material includes an auger rotatably mounted in a tube. A toothed belt drive pulley is secured to a drive shaft and is rotatably driven about a drive pulley rotational axis. The drive shaft is generally parallel to the auger. A toothed belt driven pulley is secured to the auger for rotation therewith about a driven pulley rotational axis. A toothed belt extends around the driven pulley and the drive pulley and the auger is thereby rotatably driven for transporting bulk material through the tube. The drive shaft is selectively adjustable for tensioning the belt and for placing the drive pulley rotational axis generally parallel with the driven pulley rotational axis.

9 Claims, 16 Drawing Sheets

TOOTHED BELT DRIVE SYSTEM FOR AUGERS

CROSS REFERENCE TO RELATED APPLICATIONS

This application claims priority under 35 U.S.C. 119(e) of U.S. provisional patent application Ser. No. 61/404,948 filed on Oct. 12, 2010 entitled TOOTHED BELT DRIVE SYSTEM FOR AUGERS the disclosure of which is hereby incorporated herein by reference.

BACKGROUND OF THE INVENTION

1. Field of the Invention

The present invention relates to the technical field of augers which are rotatably driven within a tube for trnasporting bulk materials such as grains, corn, sawdust, beans, silage, ear corn, husks, cobs, etc., through the tube. More particularly, the present invention relates to a toothed belt drive system which is used for rotatably driving the auger within the tube and which is reliable, long lasting and requires minimum maintenance.

2. Background

Augers are today commonly used for moving bulk free-flowing granular material such as grains, corn, sawdust, beans, etc. as well as non-free-flowing material such as silage, ear corn, husks, cobs, etc. Such augers can be powered with electric motors, hydrocarbon engines, the power take-off (PTO) of a tractor and other such power sources. The power source is typically coupled to the auger through gear boxes and sprocket and chain assemblies for selectively rotatably driving the auger within its tube and for thereby transporting/moving the bulk material through the tube.

Although the known augers function generally well for their intended purpose, a need exist for a more reliable, low maintenance, long lasting and relatively cost effective auger assembly.

SUMMARY OF THE INVENTION

In one form thereof the present invention is directed to an auger assembly for transporting bulk material. The assembly includes an elongate tube and an auger rotatably mounted in the tube. A toothed belt driven pulley is secured to the auger for rotation therewith about a driven pulley rotational axis. A toothed belt drive pulley is secured to and is rotatably driven by a drive shaft about a drive pulley rotational axis. A toothed belt extends around the driven pulley and the drive pulley. The auger is thereby selectively rotatably driven in the tube for transporting bulk material therethrough.

Preferably, the drive shaft and the auger are parallel to one another. A first bearing rotatably supports the drive shaft and the first bearing is supported on the elongate tube. A second bearing rotatably supports the drive shaft. The second bearing is supported on the elongate tube and is selectively movable relative to the elongate tube for thereby adjusting the distance between the auger and the drive shaft. The first bearing is located between the drive pulley and the second bearing. The drive pulley rotational axis is thereby selectively adjusted and placed generally parallel with said driven pulley rotational axis.

More preferably, the first bearing is also selectively movable relative to the elongate tube for thereby adjusting the distance between the drive pulley and the driven pulley. The driven pulley and drive pulley are located adjacent a terminal end of the elongate tube and the elongate tube includes an opening adjacent the terminal end wherethrough the bulk material may enter or exit the tube.

In another preferred embodiment, the drive shaft and the auger are parallel to one another; a bracket is provided adjacent the driven pulley and the drive pulley; the auger includes a driven shaft rotatably supported on the bracket; and the drive shaft is rotatably supported on the bracket. A second bracket is provided adjacent the driven pulley and the drive pulley. The driven and drive pulleys are located between the first and the second brackets and the driven shaft and drive shafts are also rotatably supported on the second bracket. A bearing rotatably supports the drive shaft. The bearing is supported on one of the first or second brackets and is selectively movable relative to the driven shaft.

In this embodiment also, a second bearing can preferably rotatably support the drive shaft. The second bearing is supported on the elongate tube and is selectively movable relative to the elongate tube for thereby adjusting the distance between the auger and the drive shaft. The first bearing is located between the drive pulley and the second bearing.

In another form thereof, the present invention is directed to an auger assembly for transporting bulk material and includes an elongate tube and an auger rotatably mounted in the tube. A driven wheel is secured to the auger for rotation therewith about a driven wheel rotational axis. A drive wheel is secured to and is rotatably driven by a drive shaft about a drive wheel rotational axis. A flexible endless member extends around the driven wheel and the drive wheel, whereby the auger is selectively rotatably driven in the tube for transporting bulk material therethrough. The drive shaft and the auger are parallel to one another. A first bearing rotatably supports the drive shaft and the first bearing is supported on the elongate tube. A second bearing also rotatably supports the drive shaft. The second bearing is supported on the elongate tube and is selectively movable relative to the elongate tube for thereby adjusting the distance between the auger and the drive shaft. The first bearing is located between the drive wheel and the second bearing, whereby the drive wheel rotational axis may be adjusted and placed generally parallel with the driven wheel rotational axis. Preferably, the first bearing is also selectively movable relative to the elongate tube for thereby adjusting the distance between the drive wheel and the driven wheel.

In another form thereof, the present invention is directed an auger assembly for transporting bulk material and includes an elongate tube and an auger rotatably mounted in the tube. A driven wheel is secured to the auger for rotation therewith about a driven wheel rotational axis. A drive wheel is secured to and is rotatably driven by a drive shaft about a drive wheel rotational axis. A flexible endless member extends around the driven wheel and the drive wheel, whereby the auger is selectively rotatably driven in the tube for transporting bulk material therethrough. The drive shaft and the auger are generally parallel to one another. A bracket is provided adjacent the driven wheel and the drive wheel. The auger includes a driven shaft rotatably supported on the bracket. The drive shaft is rotatably supported on the bracket. A second bracket is provided adjacent the driven wheel and the drive wheel. The driven and drive wheels are located between the first and second brackets. The driven shaft and the drive shaft are rotatably supported on the second bracket.

Preferably, a bearing rotatably supports the drive shaft and the bearing is supported on one of the first or second brackets. The bearing is selectively movable relative to the driven shaft. A second bearing rotatably also supports the drive shaft. The second bearing is supported on the second bracket and is selectively movable relative to the auger driven shaft for thereby adjusting the distance between the auger driven shaft and the drive shaft.

In yet another form thereof, the present invention is directed an auger assembly for transporting bulk material and includes an elongate tube and an auger rotatably mounted in the tube. A driven wheel is secured to the auger for rotation therewith about a driven wheel rotational axis. A drive wheel is secured to and is rotatably driven by a drive shaft about a drive wheel rotational axis. A flexible endless member extends around the driven wheel and the drive wheel, whereby the auger is selectively rotatably driven in the tube for transporting bulk material therethrough. A means is provided for tensioning the flexible endless member and for adjusting and placing the driven wheel rotational axis generally parallel with the drive wheel rotational axis.

BRIEF DESCRIPTION OF THE DRAWINGS

The above mentioned and other features of this invention, and the manner of attaining them, will become more apparent and the invention itself will be better understood by reference to the following description of the embodiments of the invention taken in conjunction with the accompanying drawings, wherein.

Figure 1:
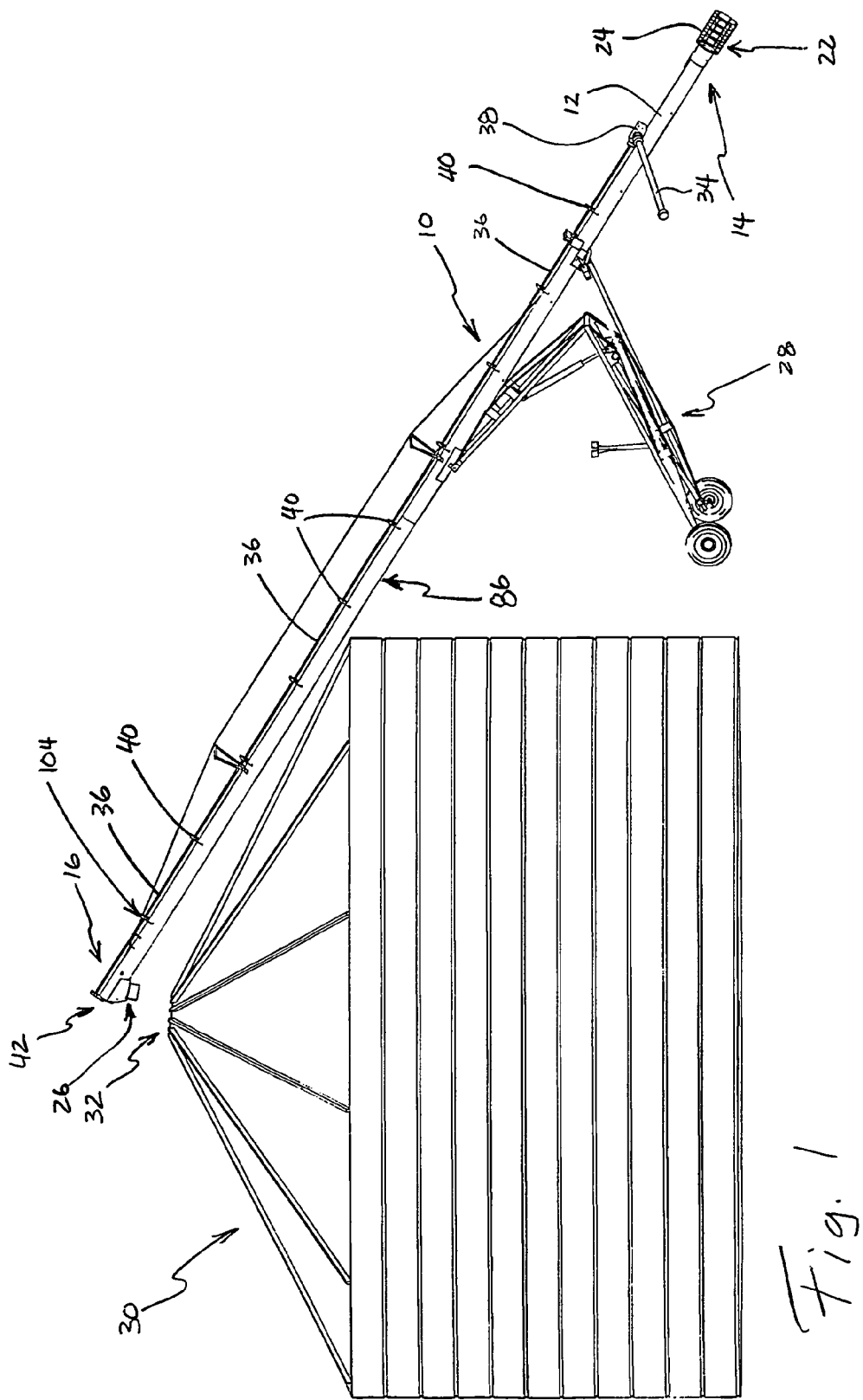
FIG. 1 is a side elevation view of a bulk feed/grain auger incorporating a toothed belt drive system of the present invention and depicting the auger adjacent a silo as would be used for transporting bulk feed up and into the silo.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Figure 2:
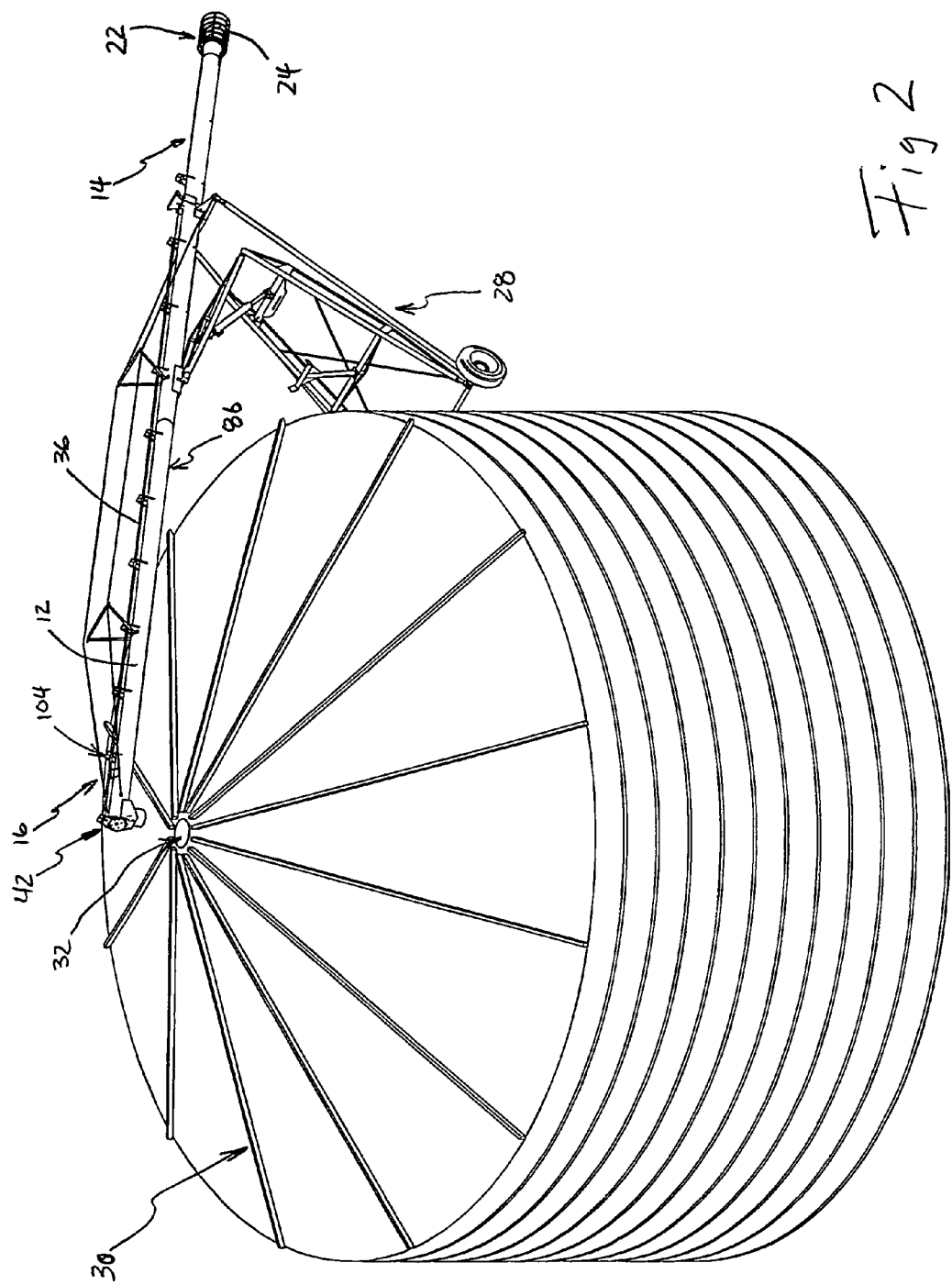
FIG. 2 is a perspective view of the auger and silo shown in FIG. 1.

Referring initially to FIGS. 1 and 2, a bulk feed auger is shown and generally depicted by the numeral 10. Bulk feed auger 10 includes a delivery tube 12 having an inlet end 14 and an outlet end 16. An auger 20 comprising a central shaft 18 and flighting 83 extends axially within the delivery tube 12 from the inlet end 14 to the outlet end 16. An intake opening 22 is provided at the inlet end 14 with a safety cage 24 thereover. By rotationally driving the auger 20, bulk material is caused to travel upwardly through the delivery tube 12 until it reaches and exits through the outlet opening 26 at the outlet end 16. The delivery tube 12 and auger 20 are preferably made of steel, although plastic materials can be used as well, and are assembled generally as shown in a known and customary manner.

The bulk feed auger 10 includes a wheeled support structure 28 for selectively transporting and raising the bulk feed auger 10 as needed or desired, for example, adjacent a silo 30 for use in transporting bulk feed material up and into the silo 30 through silo opening 32.

The auger 20 is rotationally driven with the power take-off (PTO) of a tractor or other power sources (not shown). In the embodiment shown in FIG. 1, PTO shaft 34 is adapted to be attached to and rotatably driven by a tractor or other power source. Drive shaft 36 is in turn rotatably driven through the gear box 38.

The drive shaft 36 is rotatably supported along the outside of the delivery tube 12 with spaced bracket and bearing assemblies 40. The drive shaft 36 extends generally from the inlet end 14 to the outlet end 16 whereat a drive system 42, in accordance with the present invention, in turn rotatably drives the auger 20.

Referring now more particularly to FIGS. 3-8, the drive system 42 includes an end bracket 44 secured to the outlet end 16 of the delivery tube 12 near the outlet opening 26. End bracket 44 is made of steel and is secured to the delivery tube 12 by welding or other suitable means. End bracket 44 includes side stiffening walls 46 preferably integrally formed with the end bracket 44 by bending in a position as shown. End bracket 44 further includes a hole 48 for receiving therethrough the auger central shaft 18, and a hole 50 for receiving the drive shaft 36 therethrough. Drive shaft hole 50 is larger in diameter than the drive shaft 36 for selectively moving and locating the drive shaft 36 at a desired distance from the central shaft 18. Slots 52 are also provided on the end bracket 44 for selectively mounting the bearing block 54 thereto at a desired distance from the central shaft 18.

Figure 8:
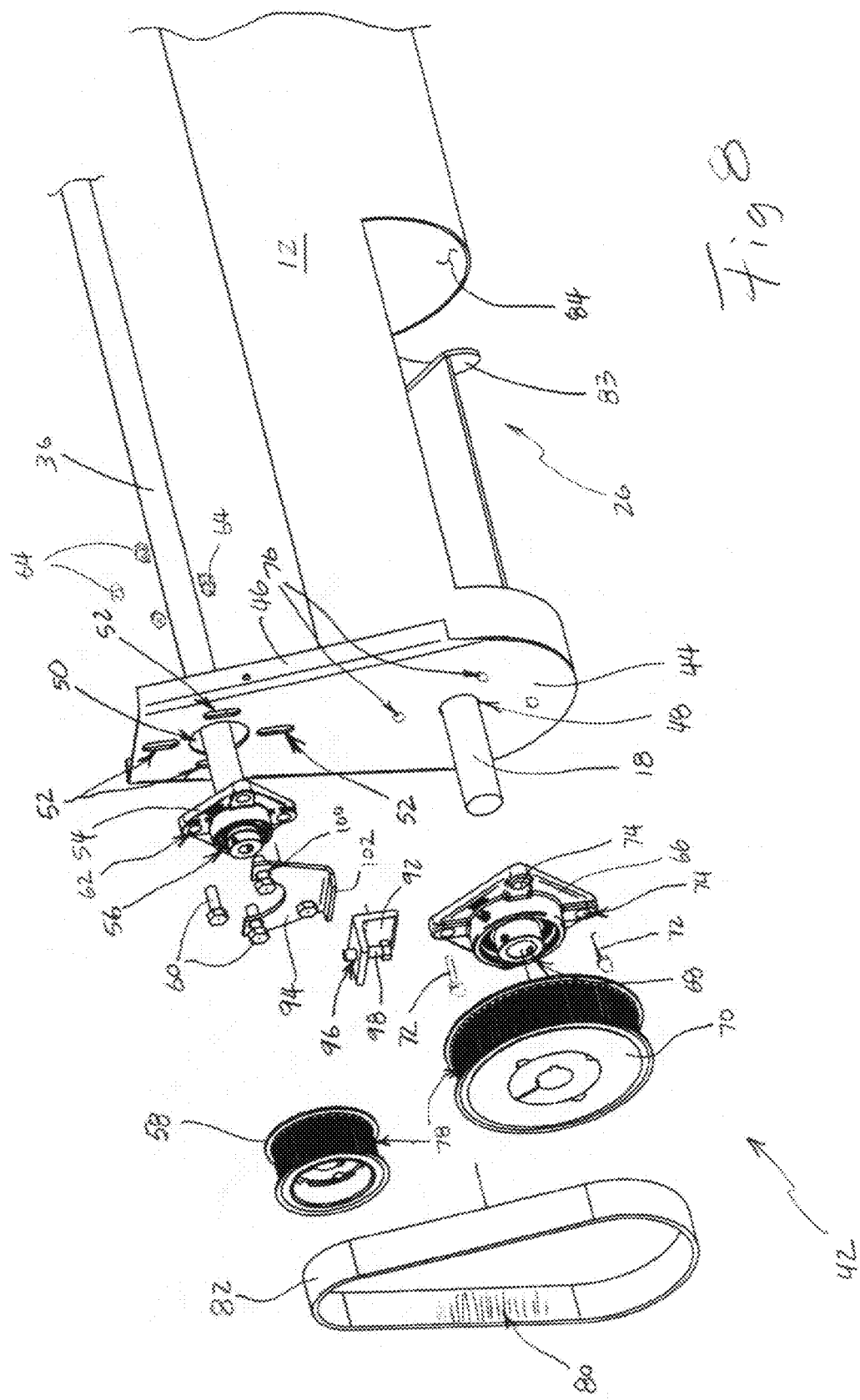
FIG. 8 is an exploded perspective view of the drive system as shown in FIG. 6.

As best seen in FIG. 8, the bearing block 54 includes a hole 56 for receiving the drive shaft 36 therethrough. Drive shaft 36 is received through hole 56 and is freely rotatable within the bearing block 54. A toothed belt sprocket/pulley 58 is provided and is secured to the end of drive shaft 36 and is, thus, rotatably driven by shaft 36. The bearing block 54 is secured to the end bracket 44 using bolts 60 which extend through holes 62 in the bearing block 54 and the slots 52 in the end bracket. Bolts 60 threadingly engage nuts 64 on the other side of the end bracket 44. As can be appreciated, by loosening the bolts 60, bearing block 54 and the bolts 60 extending through slots 52 can be moved for adjusting the distance between the drive shaft 36 and the auger central shaft 18 as permitted by the length of the slots 52 and the drive shaft hole 50. Tightening bolts 60 then causes the bearing block 54 to be frictionally secured to the end bracket 44 at the desired distance from the auger central shaft 18.

A second bearing block 66 is provided and is used for rotatably supporting the auger central shaft 18. Second bearing block 66 includes a hole 68 wherethrough the central shaft 18 is received. A second toothed sprocket/pulley 70 is provided and is secured to the end of the auger central shaft 18 for rotation therewith. The second bearing block 66 is secured to the end bracket 44 with bolts 72 that extend through holes 74 in the second bearing block 66 and corresponding holes 76 through the end bracket 44. Holes 76 can be threaded and/or nuts (not shown) can be provided on the other side of the end bracket 44 for threadingly engaging the bolts 72 and securing the bearing block 66 on the end bracket 44.

Each of the toothed pulleys 58, 70 are provided with longitudinally extending teeth 78 which correspond to and are adapted to engage the teeth 80 of the toothed belt 82. Toothed belt 82 extends around pulleys 58 and 70 and causes the pulleys to be in driving engagement with one another. Accordingly, toothed pulley 58 is rotatably driven by the drive shaft 36 thereby causing the second pulley 70 to be driven via the toothed belt 82 which, in turn, thereby causes the auger central shaft 18 to be rotatably driven for moving the bulk feed material through the delivery tube 12. The relative sizes/diameters of the pulleys 58 and 70 can be varied as needed for selectively driving the auger 20 at the desired speed and with a desired torque.

Figure 5:
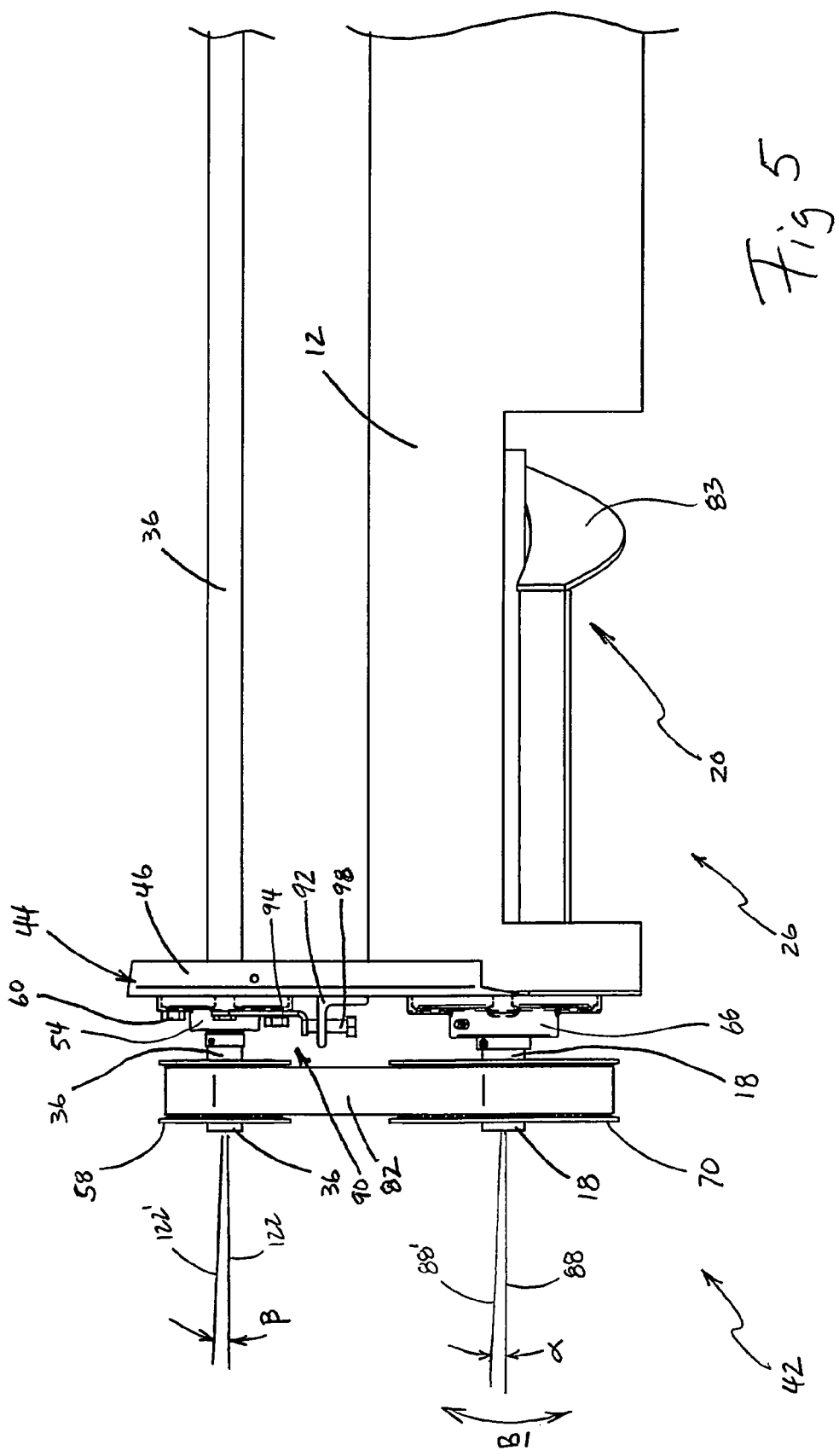
FIG. 5 is a closer side elevation view of the drive system shown in FIG. 3.
Figure 6:
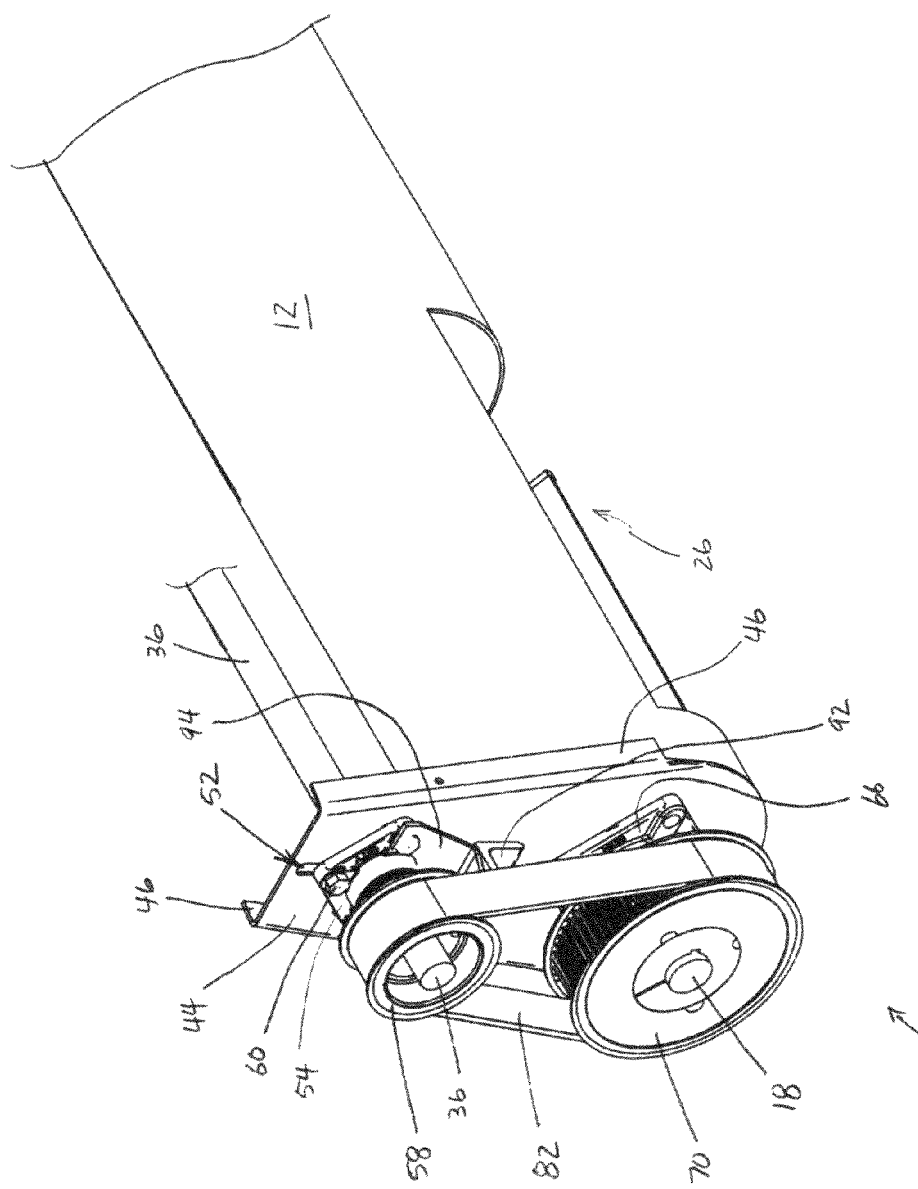
FIG. 6 is a perspective view of the drive system as shown in FIG. 5.
Figure 7:
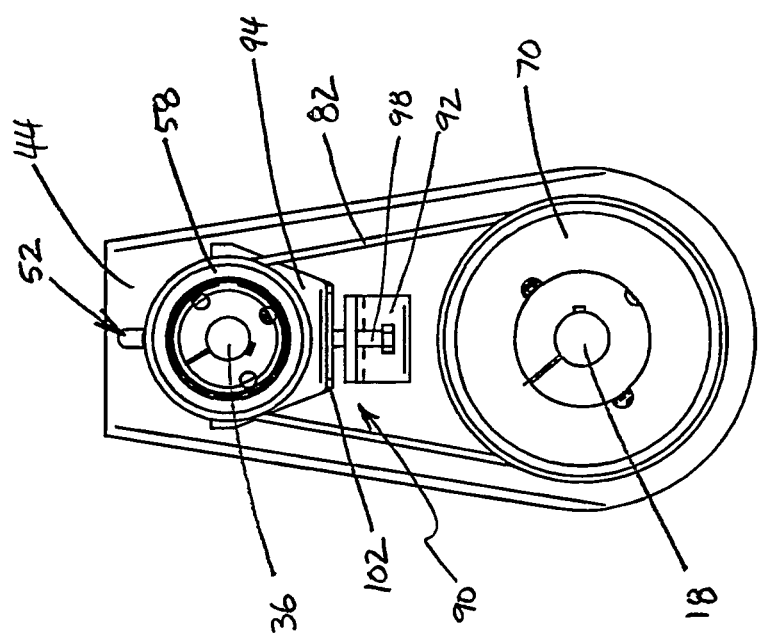
FIG. 7 is an end elevation view of the drive system as shown in FIG. 5.
Figure 11:
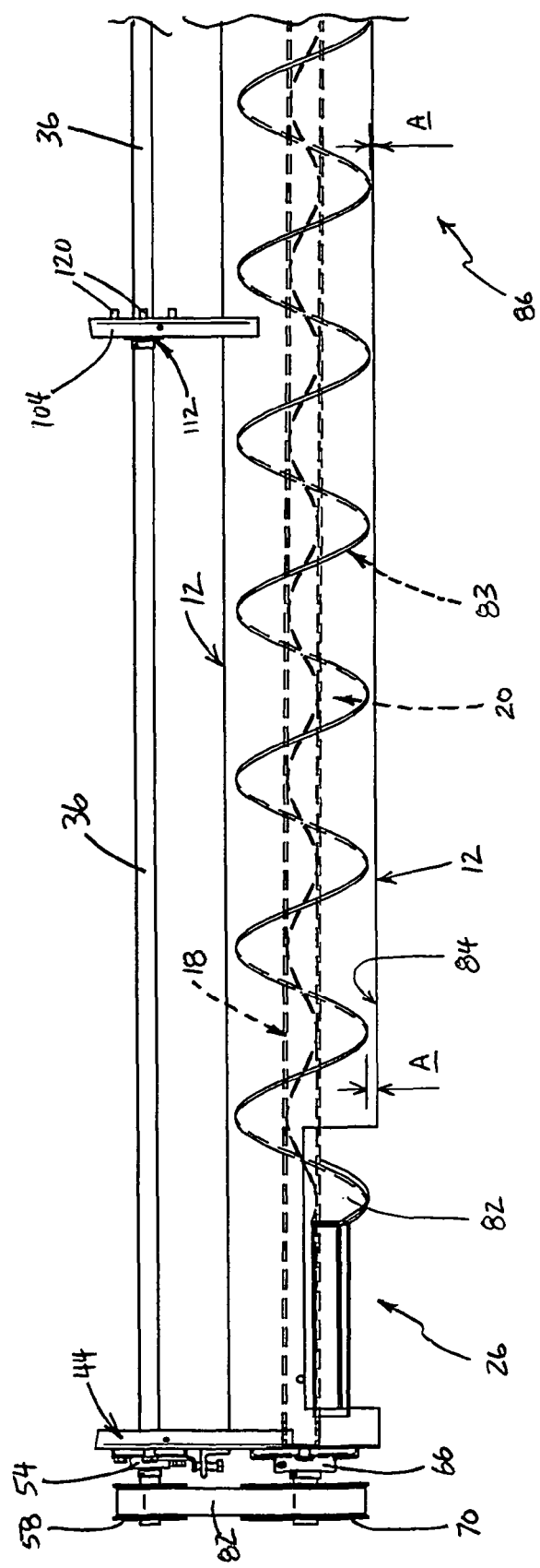
FIG. 11 is a side elevation view of the drive system shown in FIG. 4 and depicting in dash lines the auger which is rotatably driven within the delivery tube.

It has been found that the use of a toothed belt and toothed pulleys for driving the auger 20 is substantially beneficial for providing a drive system 42 which is reliable and long lasting. This is especially true when the drive system is exposed to harsh dusty environments and the outdoor elements. However, to achieve this result, the belt 82 must be properly aligned around the pulleys 58, 70. That is, the pulleys 58, 70 must be generally parallel to one another. Otherwise, the toothed belt 82 will tend to move longitudinally along one or both of the pulleys thereby causing the belt to wear prematurely and/or perhaps even come off of the pulleys. This is further complicated by the fact the bulk feed auger 10 must be constructed with a gap A between the auger flighting 83 and the inside surface 84 of the delivery tube 12. (See FIG. 11.) Gap A is required so that the auger 20 may rotationally move generally freely within the delivery tube 12, and for reducing the required torque for driving the auger. However, this causes the auger 20 to sag within the delivery tube 12 as diagrammatically depicted in FIG. 11. That is, at a central area 86 of the delivery tube 12, the auger 20 typically sags as a result of gravitational forces and the gap A is substantially diminished and/or the flighting 82 may come in contact with the inside surface 84 of the delivery tube 12. As a result of the auger sagging and/or perhaps other unknown reasons, and because the central shaft 18 is securely rotatably supported by the second bearing block 66 to the end of the delivery tube 12, the end of the central shaft 18 can pivot about the bearing block 66 as depicted by arrows B. That is, as shown in FIG. 5, the normal central axis 88 of the central shaft 18 can, as a result of sagging, cause the end of the central shaft 18 to bend placing the central axis 88 in a position as depicted by line 88' at an angle α. As a result thereof, pulley 70 can be displaced relative to the delivery tube 12 and the drive shaft 36 thereby causing misalignment with the pulley 58. Stated differently, the sagging of the auger 20 can cause the central shaft 18 to bend about the second bearing block 66 and thereby cause the rotational axis of pulley 70 to no longer be parallel with the rotational axis of pulley 58. Such misalignment, as can now be appreciated, can cause premature wear and can be detrimental to the operation of the drive system 42.

Taking into consideration the sagging of auger 20 and the fact that the rotational axis of pulley 70 will not always be collinear with the delivery tube 12 and, in fact, the central shaft may bend at an angle α, the drive system 42 of the present invention includes means for providing proper tension on the belt 82 and for also adjusting and placing the rotational axis of pulley 58 generally parallel with the rotational axis of pulley 70. To this end, as described hereinabove, the distance between central shaft 18 and the drive shaft 36 can be selectively adjusted by loosening the bolts 60 and shifting the bolts 60 and bearing block 54 along the slots 52.

For further assisting in the placement of the drive shaft 36 and tensioning the belt 82, the drive system 42 includes a placement and/or tensioning mechanism 90 including a stationary bracket 92 and a movable bracket 94. Stationary bracket 92 is L shaped and is secured to the end bracket 44 by welding or other suitable means. Stationary bracket 92 further includes a threaded hole 96 and a bolt 98 threadingly engaged and extending therethrough. The movable bracket 94 includes holes 100 which are aligned with holes 62 of the bearing block 54. Bolts 60 extend through holes 100, as best seen in FIG. 8, for securing the movable bracket 94 to the bearing block 54. Movable bracket 94 further includes a bearing seat 102 preferably formed by bending the steel material from which the bracket 94 is formed.

As best seen in FIG. 5, the end of bolt 98 bears against the bearing seat 102. Accordingly, by loosening the bolts 60 and turning bolt 98, bolt 98 is forced against bearing seat 102 thereby causing the movable bracket 94 and bearing block 54 to move in a direction away from the central shaft 18. The bearing block 54 can thereby be located at a desired distance from the central shaft 18 and a desired amount of tension can be placed on the toothed belt 82. The nuts 64 are then tightened onto bolts 60 for frictionally securing the bearing block 54 to the end bracket 44 at the desired location.

Figure 3:
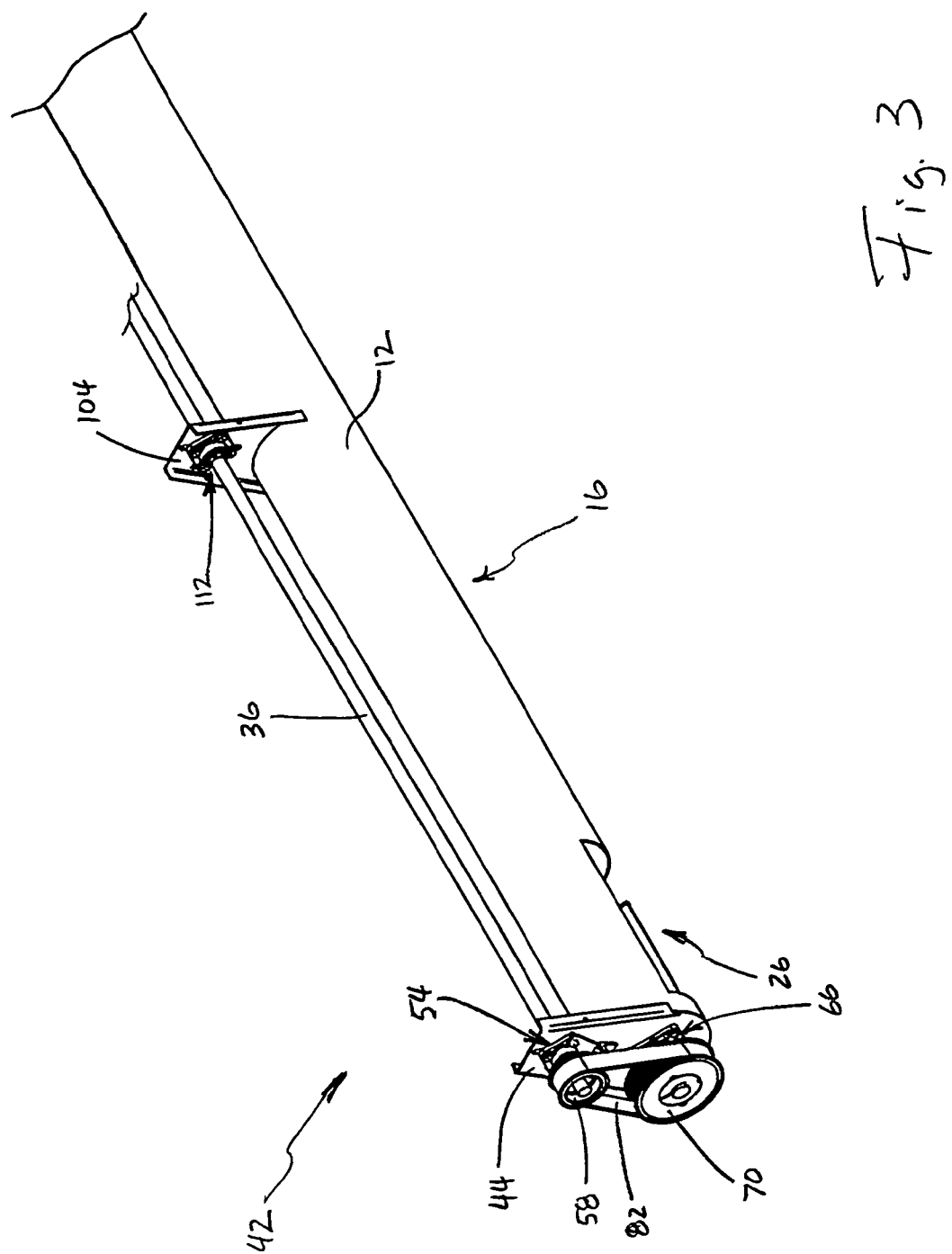
FIG. 3 is a perspective view of the top end of the auger shown in FIG. 1 and showing the toothed belt drive system constructed in accordance with the principles of the present invention.
Figure 4:
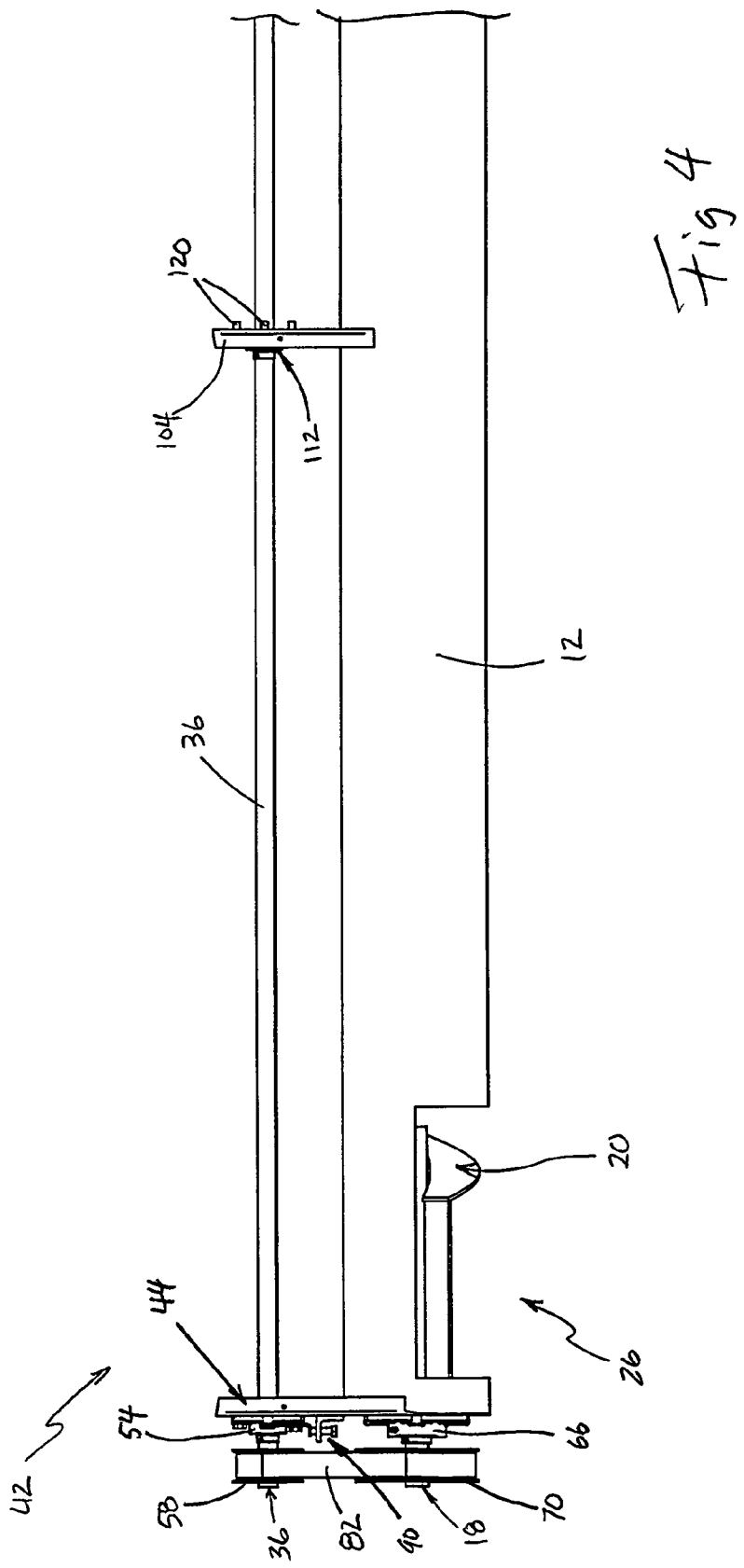
FIG. 4 is a side elevation view of the drive system shown in FIG. 3.
Figure 9:
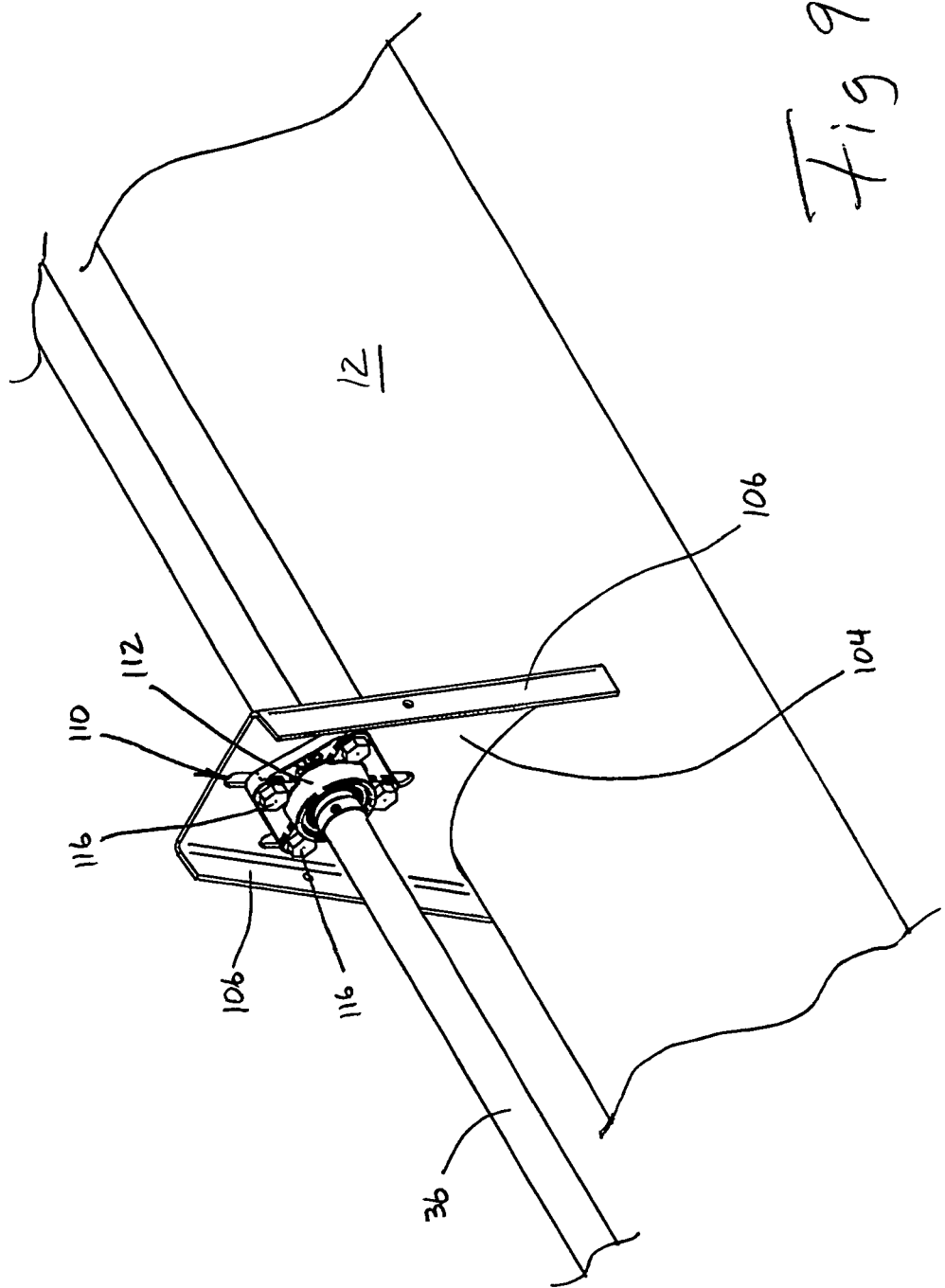
FIG. 9 is a perspective view of part of the drive system shown in FIG. 4.
Figure 10:
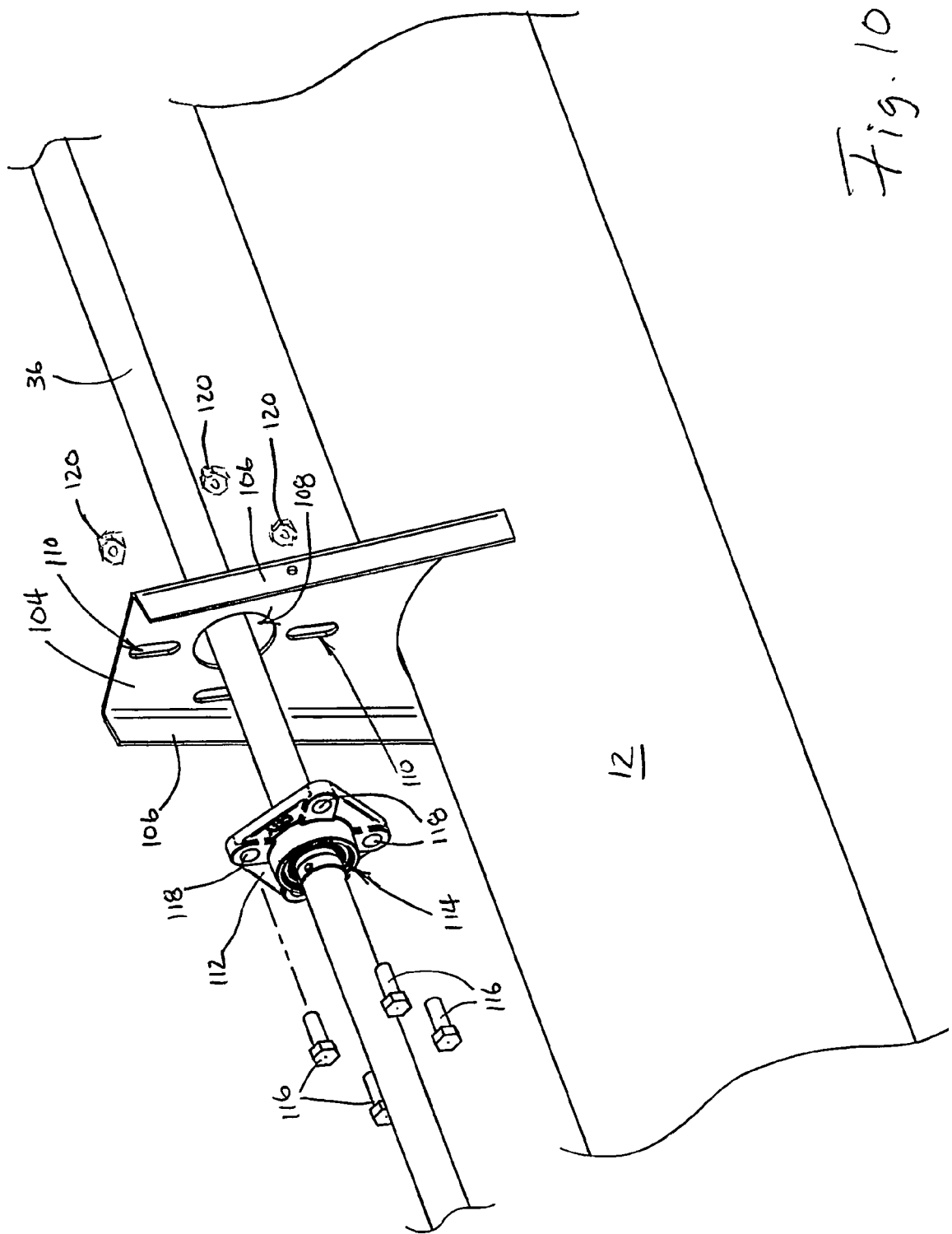
FIG. 10 is an exploded perspective view of the drive system shown in FIG. 9.

Drive system 42 further includes a means for adjusting the angle of the rotational axis of the toothed pulley 58 for placement in parallel alignment with the rotational axis of the toothed pulley 70. As best seen in FIGS. 3, 9 and 10, the drive system 42 includes an inboard bracket 104 mounted to the delivery tube 12 by welding or other suitable means. Inboard bracket 104, similar to end bracket 44, includes side stiffening walls 106, a drive shaft hole 108 and slots 110. Drive shaft hole 108, similar to drive shaft hole 50, is larger than the drive shaft 36. A second drive shaft bearing block 112 is provided and includes a hole 114 wherethrough the drive shaft 36 is received and rotatably supported. Bolts 116 are provided for extending through the holes 118 of the second bearing block 112 and through the slots 110, and threadingly engaging nuts 120.

Similar to the bearing block 54, the second drive shaft bearing block 112 is selectively movable for adjusting the distance between the drive shaft 36 and the delivery tube 12 and the auger central shaft 18. That is, by loosening bolts 116, the second bearing block 112 and bolts 116 can be moved along inboard bracket 104 a distance limited by the length of slots 110. When the shaft 36 and second bearing block 112 are at the desired distance relative to the delivery tube 12, the nuts 120 and bolts 116 are tightened for thereby frictionally engaging and securing the bearing block 112 to the inboard bracket 104.

As should now be appreciated, in the event the auger 20 is subjected to sagging and/or for other reasons the end of the central shaft 18 is caused to pivot about bearing 66 and causing the central shaft 18 and pulley 70 to be displaced at an angle α relative to the normal axis of rotation 88 which is collinear with the delivery tube 12, the second bearing block 112 can be moved along the inboard bracket 104 for thereby causing the drive shaft 36 to similarly bend and pivot about the bearing block 54, thereby placing the end of drive shaft 36 at an angle β which is generally equivalent to angle α. In this manner, the normal rotational axis 122 of the drive shaft 36 and pulley 58 can be placed at an angle as depicted by line 122'. Accordingly, pulley 58 and its modified axis of rotation 122' is placed parallel with the pulley 70 and its actual axis of rotation 88' such that the belt 82 remains centered as it travels around the pulleys 58, 70. Accordingly, the effectiveness and longevity of the drive system 42 is maximized.

Another embodiment for providing proper tension on the belt 82 and for also adjusting and placing the rotational axis of pulley 58 generally parallel with the rotational axis of pulley 70 is shown in FIGS. 12-16. In this embodiment, the auger central shaft 18 is rotatably supported on the end bracket 44, similar to the embodiment described hereinabove, with a bearing block 66. The drive shaft 36 is also similarly rotatably supported on the end bracket 44 with a bearing block 54. In this embodiment however, an exterior moveable bracket 124 is used for selectively slidingly moving the bearing block 54 along the end bracket 44 and thereby adjusting the distance between the driving shaft 36 and the auger central shaft 18. Exterior movable bracket 124 includes holes 126 which are aligned with holes 62 of the bearing block 54 and which are adapted to receive the bolts 60 therethrough. A drive shaft hole 128 is provided for receiving drive shaft 36 therethrough.

Bracket 124 is L-shaped and is preferably formed by bending flat steel stock and forming a lip 130. A bolt/threaded shaft 132 extends through a hole in the lip 130 and nuts 134 are provided on both sides of the lip 130. Bolt 132 extends down to and bears against a bearing plate 136 which sits on the exterior surface of the delivery tube 12. Accordingly, by loosening the bolts 60 and threadingly adjusting the nuts 134 along the bolt 132, the movable bracket 124 and the bearing block 54 are selectively movable toward or away from the central shaft 18. The bearing block 54 can thereby be located at a desired distance from the central shaft 18 and a desired amount of tension can be placed on the toothed belt 82. Nuts 64 are then tightened onto bolts 60 for frictionally securing the bearing block 54 and the movable bracket 124 to the end bracket 44 at the desired location.

Figure 14:
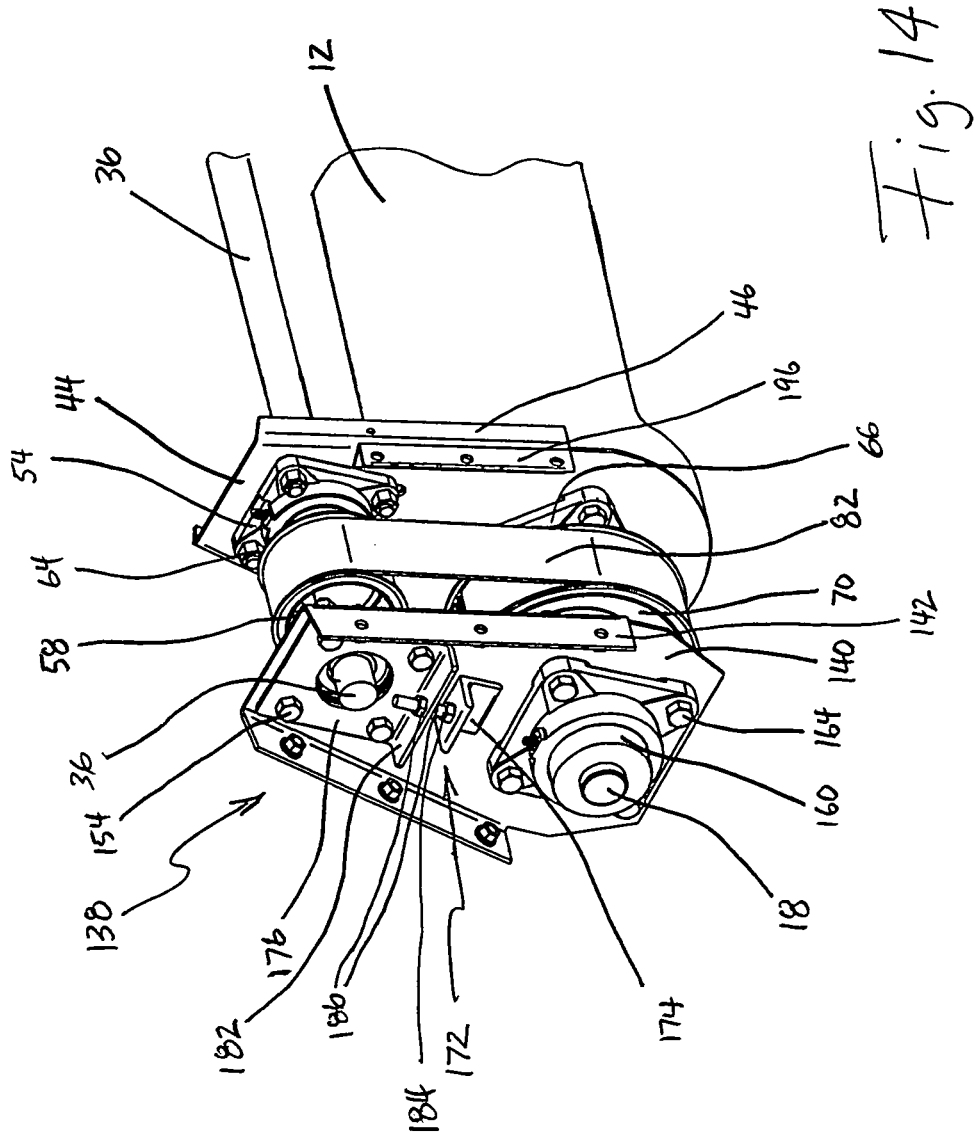
FIG. 14 is a rear end perspective view of the drive system shown in FIG. 13.
Figure 15:
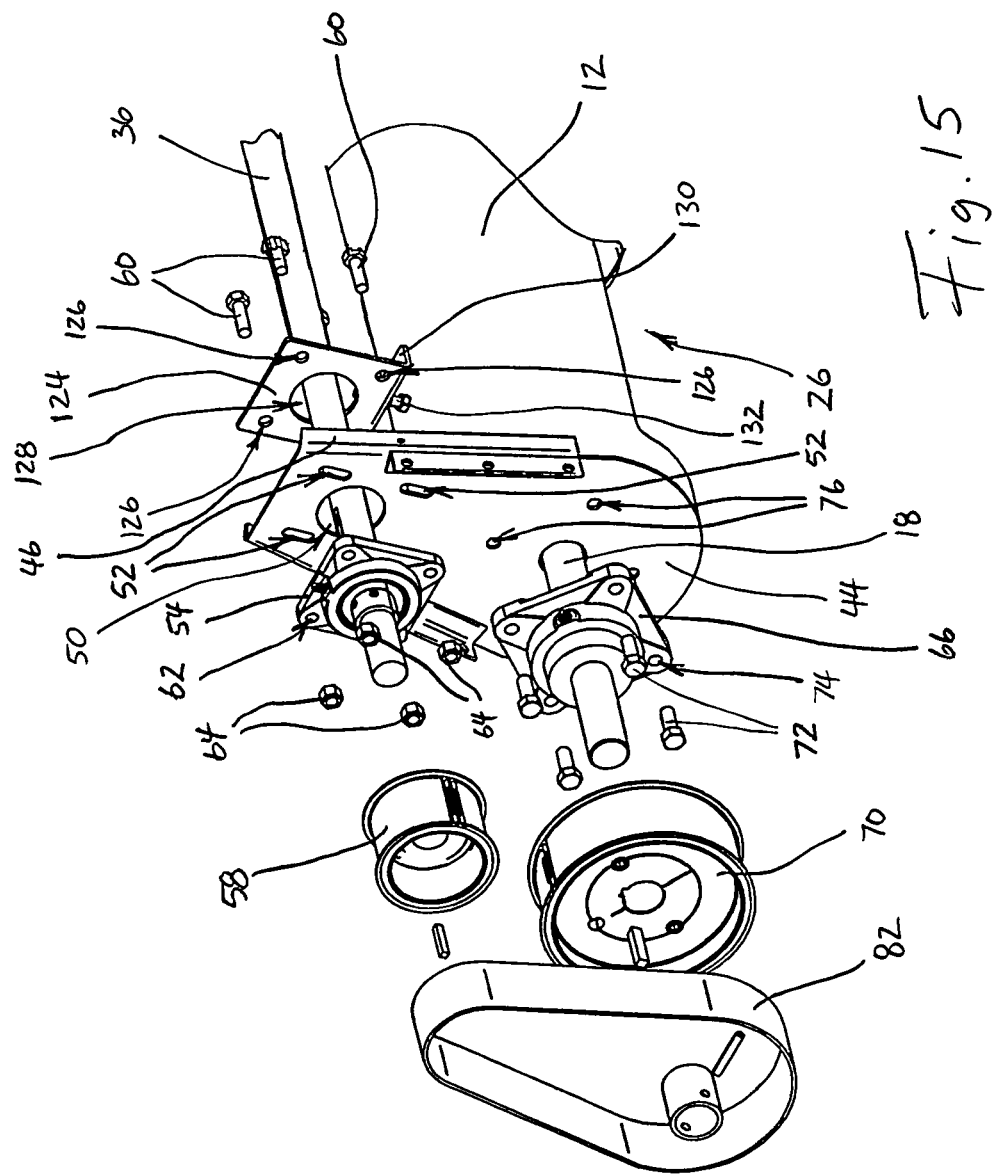
FIG. 15 is a rear end exploded perspective view of the drive system shown in FIG. 13 and showing only the assembly of the pulleys to the end bracket; and, FIG. 16 is a rear end exploded perspective view of the drive system shown in FIG. 13, similar to FIG. 15, and also showing the rear bracket assembly.
Figure 16:
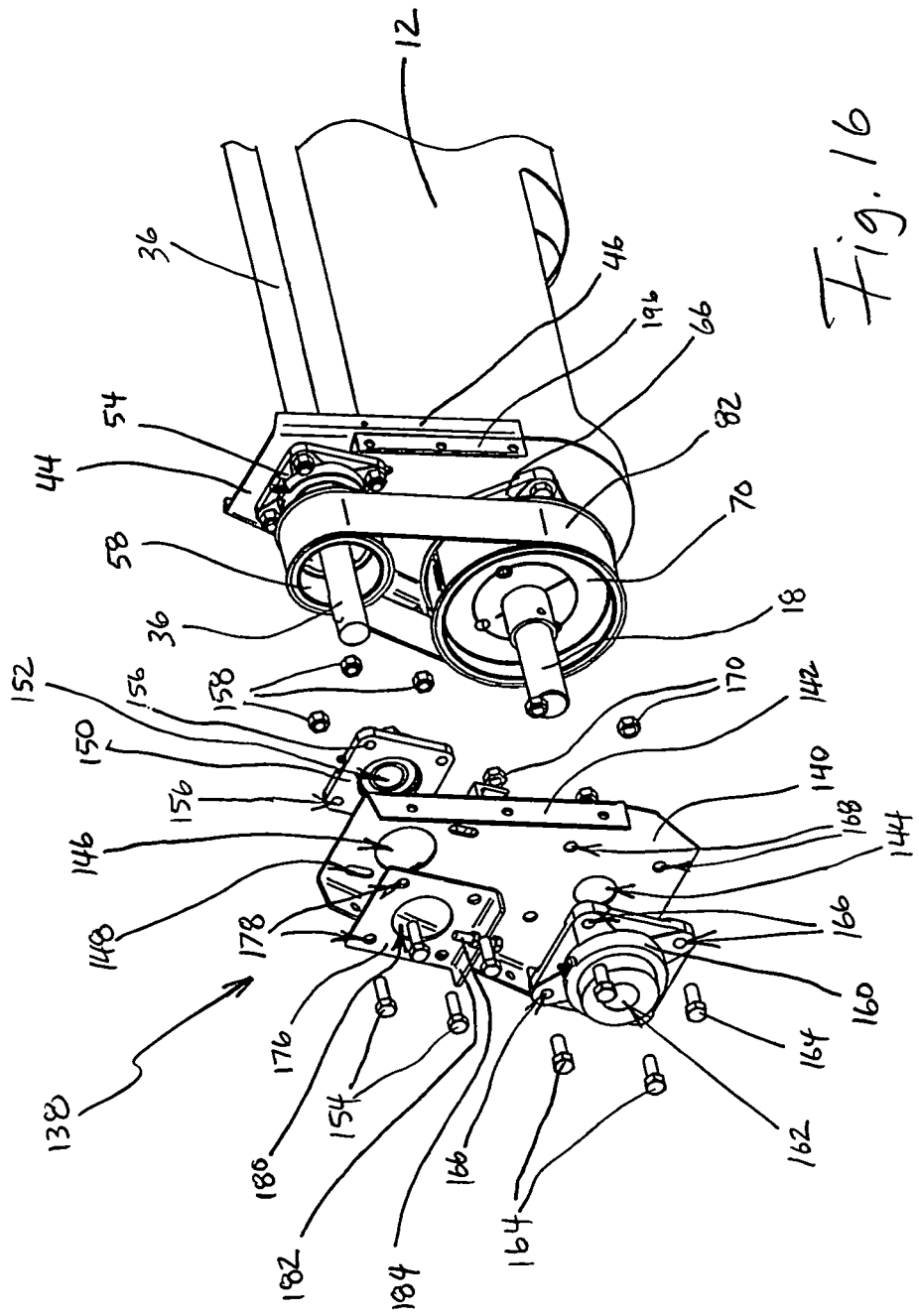

Referring now more particularly to FIGS. 14 and 16, in this embodiment the drive shaft 36 and the auger central shaft 18 are extended beyond the pulleys 58, 70 and are each rotatably supported by the rear bearing assembly 138. Assembly 138 includes a rear bracket 140 which is made of steel and, similar to end bracket 44, includes side stiffening walls 142 preferably integrally formed with the rear bracket 140 by bending. End bracket 140 further includes a hole 144 for receiving therethrough the auger central shaft 18, and a hole 146 for receiving the drive shaft 36 therethrough. Drive shaft hole 146 is larger in diameter than the drive shaft 36 for selectively moving and locating the drive shaft 36 at a desired distance from the central shaft 18. Slots 148 function similar to slots 52 and are provided on the rear bracket 140 for selectively mounting the bearing block 150 thereto at a desired distance from the central shaft 18.

As best seen in FIG. 16, the bearing block 150 includes a hole 152 for receiving the drive shaft 36 therethrough. Drive shaft 36 is received through hole 152 and is freely rotatable within the bearing block 150. The bearing block 150 is secured to the rear bracket 140 using bolts 154 which extend through the slots 148 in the rear bracket 140 and the holes 156 in the bearing block 150. Bolts 154 threadingly engage nuts 158 on the other side of the rear bracket 140. As can be appreciated, by loosening the bolts 154, bearing block 150 and the bolts 154 extending through slots 148 can be moved for adjusting the distance between the drive shaft 36 and the auger central shaft 18 as permitted by the length of the slots 148 and the drive shaft hole 146. Tightening the nuts 158 onto the bolts 154 then causes the bearing block 150 to be frictionally secured to the rear bracket 140 at the desired distance from the auger central shaft 18.

Another bearing block 160 is provided and is used for rotatably supporting the auger central shaft 18. Bearing block 160 includes a hole 162 wherethrough the central shaft 18 is received. The bearing block 160 is secured to the rear bracket 140 with bolts 164 that extend through holes 166 in the bearing block 66 and corresponding holes 168 through the rear bracket 140. Nuts 170 are provided on the other side of the rear bracket 140 for threadingly engaging the bolts 164 and securing the bearing block 160 on the rear bracket 140.

The embodiment of FIGS. 12-16, similar to the above described embodiment, includes means for providing proper tension on the belt 82 and for also adjusting and placing the rotational axis of pulley 58 generally parallel with the rotational axis of pulley 70. To this end, as described hereinabove, the distance between central shaft 18 and the drive shaft 36 can be selectively adjusted by loosening the bolts 60 and shifting the bolts 60 and bearing block 54 along the slots 52 of end plate 44.

For further assisting in the placement of the drive shaft 36 parallel to the auger shaft 18 and properly tensioning the belt 82, as best seen in FIG. 14, the rear bearing assembly 138 includes a placement and/or tensioning mechanism 172 including a stationary bracket 174 and a movable bracket 176. Stationary bracket 174 is L-shaped and is secured to the rear bracket 140 by welding or other suitable means.

Movable bracket 176 includes holes 178 which are aligned with holes 156 of the bearing block 150. Bolts 154 extend through holes 178 of the moveable bracket 176, slots 148 of the rear bracket 140 and holes 156 or the bearing block 150 for securing the movable bracket 176 and the bearing block 150 to the rear bracket 140. A drive shaft hole 180 is provided for receiving drive shaft 36 therethrough.

Moveable bracket 176 is L-shaped and is preferably formed by bending flat steel stock and forming a lip 182. A bolt/threaded shaft 184 extends through a hole in the lip 182 and nuts 186 are provided on bolt 184 on both sides of the lip 182. Bolt 184 extends down to and bears against the stationary/bearing bracket 174. Accordingly, by loosening the bolts 154 and threadingly adjusting the nuts 186 along the bolt 184, the movable bracket 176 and the bearing block 150 are selectively movable toward or away from the central shaft 18. The bearing block 150 can thereby be located at a desired distance from the central shaft 18 so that a desired amount of tension can be placed on the toothed belt 82 and for also adjusting and placing the rotational axis of pulley 58 generally parallel with the rotational axis of pulley 70. Nuts 158 are then tightened onto bolts 154 for frictionally securing the bearing block 150 and the movable bracket 176 to the rear bracket 140 at the desired location.

Figure 12:
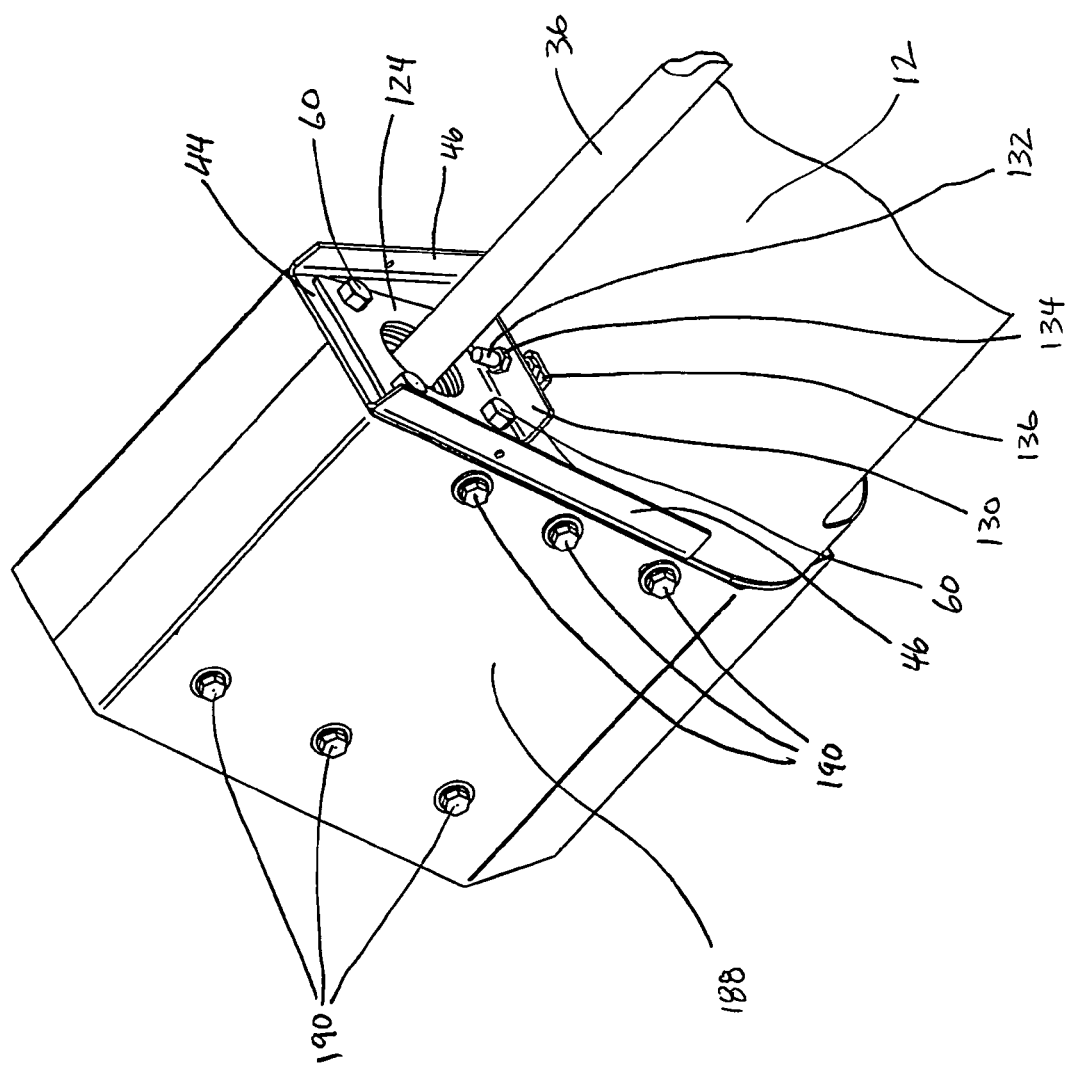
FIG. 12 is a perspective view of the top end of the auger shown in FIG. 1 and showing a second embodiment of the toothed belt drive system constructed in accordance with the principles of the present invention.
Figure 13:
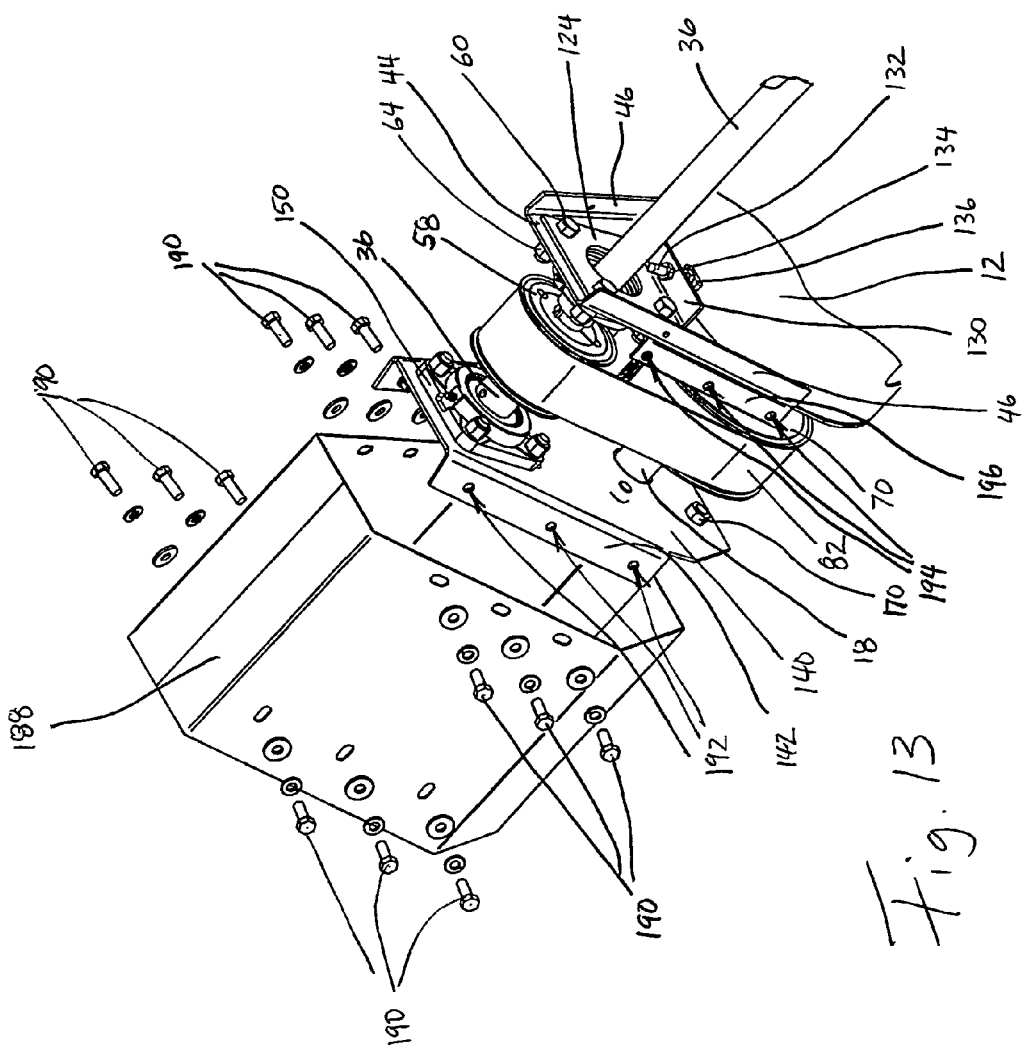
FIG. 13 is a front end perspective view of the drive system shown in FIG. 12 with the cover removed.

As best seen in FIGS. 12 and 13, a drive belt guard/cover 188 is secured to the end bracket 44 and the rear bracket 140 and surrounds the pulleys 58, 70 and belt 82. Cover 188 is secured to the rear bracket 140 with fasteners/bolts 190 which extend through holes in the cover 188 and threadingly engage threaded holes 192 in the stiffening walls 142. Cover 188 is also secured to the end bracket 44 with fasteners/bolts 190 which extend through holes in the cover 188 and theadingly engage threaded holes 194 in a stiffening channel 196 which is affixed to the end bracket 44 by welding or other suitable means. Accordingly, the guard/cover 188 is secured to the end bracket 44 and functions to support the rear bracket 140.

Although a toothed belt 82 and toothed pulleys/sprockets 58, 70 are most preferred as described hereinabove, the pulleys/sprockets can take the form of any wheel such as V-groove pulleys and chain sprockets. The belt 82 can take the form any corresponding flexible endless member such as a V-groove belt or steel chain. In such other embodiments the above described means can similarly be used for providing the proper tension on the flexible endless member and for also adjusting and placing the rotational axis of the wheel 58 on the drive shaft 36 generally parallel with the rotational axis of wheel 70 on the auger central shaft 18.

While this invention has been described as having an exemplary design, the present invention may be further modified within the spirit and scope of this disclosure. This application is therefore intended to cover any variations, uses, or adaptations of the invention using its general principles.

What is claimed is:

1. An auger assembly for transporting bulk material comprising:
   an elongate tube;
   an auger rotatably mounted in said tube;
   a toothed belt driven pulley secured to said auger for rotation therewith about a driven pulley rotational axis;
   a toothed belt drive pulley secured to and rotatably driven by a drive shaft about a drive pulley rotational axis;
   a toothed belt extending around said driven pulley and said drive pulley, whereby said auger is selectively rotatably driven in said tube for transporting bulk material therethrough;
   wherein said driven pulley and drive pulley are located adjacent a terminal end of said elongate tube;
   wherein said elongate tube includes an opening adjacent said terminal end wherethrough the bulk material may enter or exit said tube; and,
   wherein said drive shaft and said auger are parallel to one another, further comprising a first end bracket adjacent said driven pulley and said drive pulley, said auger including a driven shaft rotatably supported on said first end bracket, and wherein said drive shaft is also rotatably supported on said first end bracket.

2. The auger assembly of claim 1 further comprising a second end bracket adjacent said driven pulley and said drive pulley, said driven and drive pulleys located between said first and said second end brackets and wherein said driven shaft and said drive shaft are rotatably supported on said second end bracket.

3. The auger assembly of claim 2 further comprising a bearing rotatably supporting said drive shaft, said bearing being supported on one of said first or second end brackets, and wherein said bearing is selectively movable relative to said driven shaft.

4. The auger assembly of claim 3 further comprising a second bearing rotatably supporting said drive shaft, said second bearing being supported on said elongate tube being located a distance from said terminal end and being selectively movable relative to said elongate tube for thereby adjusting the distance between said auger and said drive shaft, said first bearing being located between said drive pulley and said second bearing.

5. An auger assembly for transporting bulk material comprising:
   an elongate tube;
   an auger rotatably mounted in said tube;
   a driven wheel secured to said auger for rotation therewith about a driven wheel rotational axis;
   a drive wheel secured to and rotatably driven by a drive shaft about a drive wheel rotational axis;
   a flexible endless member extending around said driven wheel and said drive wheel, whereby said auger is selectively rotatably driven in said tube for transporting bulk material therethrough;
   wherein said drive shaft and said auger are generally parallel to one another;
   a first end bracket secured to a terminal end of said elongate tube and located between said elongate tube terminal end and said driven wheel and said drive wheel;
   wherein said auger includes a driven shaft rotatably supported on said first end bracket;
   wherein said drive shaft is also rotatably supported on said first end bracket; and,
   a second end bracket located adjacent said first end bracket and wherein said driven shaft and said drive shaft extend to and are rotatably supported on said second end bracket; and,
   wherein said driven and drive wheels are located between said first and said second end brackets whereby said driven wheel rotational axis and said drive wheel rotational axis are maintained parallel to one another.

6. The auger assembly of claim 5 further comprising a bearing rotatably supporting said drive shaft, said bearing being supported on one of said first or second end brackets, and wherein said bearing is selectively movable relative to said driven shaft.

7. The auger assembly of claim 5 further comprising a bearing rotatably supporting said drive shaft, said bearing being supported on said second end bracket and being selectively movable relative to said auger driven shaft for thereby adjusting the distance between said auger driven shaft and said drive shaft.

8. The auger assembly of claim 5 wherein said elongate tube includes an opening adjacent said terminal end wherethrough the bulk material may enter or exit said tube.

9. The auger assembly of claim 5 further comprising a cover supported on said first and second end brackets extending over said driven and drive wheels and said endless member.

\* \* \* \* \*

UNITED STATES PATENT AND TRADEMARK OFFICE
CERTIFICATE OF CORRECTION

PATENT NO.       : 9,051,126 B2  
APPLICATION NO.  : 13/317118  
DATED            : June 9, 2015  
INVENTOR(S)      : Wehrle Page 1 of 1

It is certified that error appears in the above-identified patent and that said Letters Patent is hereby corrected as shown below:

In the Specification

Column 7, line 10, after "angle" insert -- ß --

Signed and Sealed this
Eighteenth Day of August, 2015

Michelle K. Lee
*Director of the United States Patent and Trademark Office*